United States Patent [19]
Chichester et al.

[11] 3,918,546
[45] Nov. 11, 1975

[54] HYDROSTATIC ASSIST DRIVE FOR VEHICLES

[75] Inventors: Willard L. Chichester; Donald A. Holtkamp, both of Battle Creek, Mich.

[73] Assignee: Clark Equipment Company, Buchanan, Mich.

[22] Filed: Nov. 21, 1973

[21] Appl. No.: 417,994

[52] U.S. Cl............ 180/44 M; 180/44 F; 180/66 R; 180/105 R; 187/9
[51] Int. Cl.² .................... B60K 25/00; B60K 17/34
[58] Field of Search............ 180/44 M, 44 F, 105 R, 180/66 R; 187/9

[56] References Cited
UNITED STATES PATENTS

| | | | |
|---|---|---|---|
| 2,604,109 | 7/1952 | Tuttle | 180/66 R |
| 3,053,043 | 9/1962 | Knowler | 180/44 M |
| 3,099,098 | 7/1963 | Davis | 180/66 R |
| 3,209,850 | 10/1965 | Fish | 180/66 R |
| 3,303,901 | 2/1967 | Schou | 180/66 R |
| 3,430,722 | 3/1969 | Budzich | 180/44 M |
| 3,480,099 | 11/1969 | Nighswonger et al | 180/44 M |
| 3,485,315 | 12/1969 | Bergren | 180/66 R |
| 3,612,202 | 10/1971 | Moon, Jr. | 180/66 R |
| 3,747,722 | 7/1973 | Finney | 180/44 F |

*Primary Examiner*—David Schonberg
*Assistant Examiner*—John P. Silverstrim
*Attorney, Agent, or Firm*—John C. Wiessler

[57] ABSTRACT

A hydrostatic motor assist vehicle drive system operative at the operator's option to provide intermittent drive to vehicle wheels which are normally idler wheels and which may be dirigible or non-dirigible. Separate propulsion means of any suitable kind is adapted to drive normally operative drive wheels. A vehicle speed responsive control operates independently of an auxiliary drive pump and includes an adjustable flow divider operating between the auxiliary drive pump and assist drive motors to direct fluid drive to the assist drive motors so as to maintain equal rpm of the main and assist drive wheels or equal circumferential distance travelled by such wheels for any increment of time. In one embodiment of a lift truck the auxiliary drive system is operated from the lift cylinder pump with a vehicle speed responsive control operative to control and divide pump discharge between the auxiliary drive system and the lift cylinder.

9 Claims, 4 Drawing Figures

HYDROSTATIC ASSIST DRIVE FOR VEHICLES

BACKGROUND OF THE INVENTION

The field of art to which the invention pertains relates to an auxiliary drive system for vehicles. Heretofore vehicle power transmission systems have normally been of a single type in any given wheeled vehicle, such as hydrostatic, mechanical or electrical, and have further been characterized by two and/or four-wheel drive vehicles, for example, with full power availability to two or selectively to four-wheel drive machines thereby necessitating the use of relatively expensive components in any such vehicle where four-wheel or other multiwheeled drives are used.

Auxiliary traction wheels driveable intermittently as may be required for traction under varied or adverse road or field conditions have been found to be desirable for certain of such types of vehicles.

SUMMARY

Our invention relates to an auxiliary hydrostatic drive system for vehicles operable intermittently at the operator's option to provide auxiliary drive by means of drive pump and assist drive motor means to one to more idler wheels under marginal tractive conditions, and a control means for synchronizing the auxiliary wheel speed with the main drive wheel speed to avoid wheel scrub. The control means is vehicle speed responsive and operates independently of the drive pump means. It includes an adjustable flow divider operatively between the drive pump and motor means for controlling the volume flow to the motor means for synchronizing the above wheel speeds. The pump means of the auxiliary drive system may serve also hydraulically operated mechanism associated with the vehicle which is unrelated to the vehicle drive means. Other control means is provided for directing selectively the output of the pump means either to the auxiliary drive system or to the other hydraulic mechanism.

DESCRIPTION OF THE PREFERRED EMBODIMENT

Figure 1:
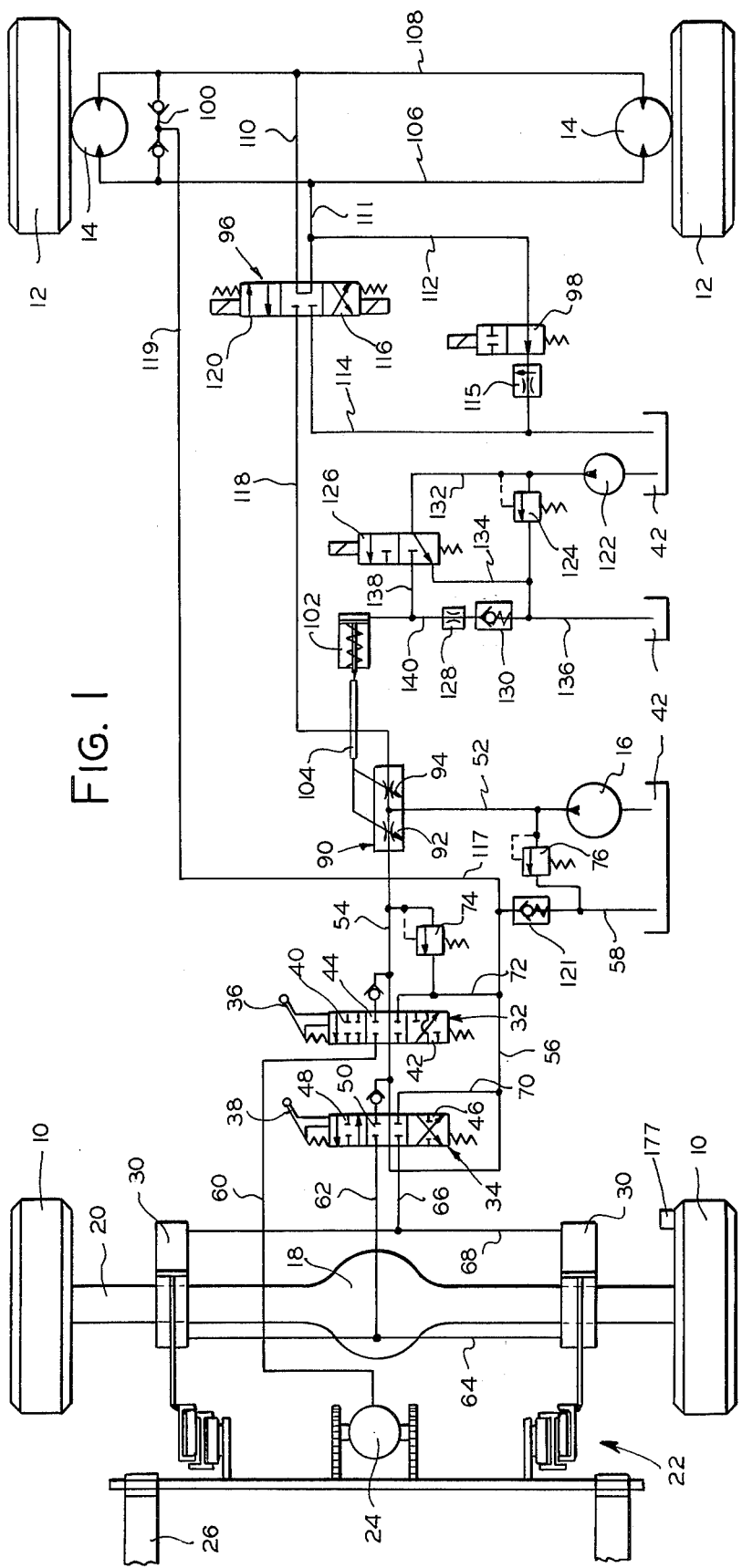
FIG. 1 is a circuit diagram of our system embodied in a fork lift truck.

An industrial lift truck is shown schematically in FIG. 1 in which a pair of non-dirigible main drive wheels are shown at numeral 10 and a pair of dirigible idler wheels at numeral 12, the latter also functioning as auxiliary drive wheels operated intermittently as desired in traction drive by a pair of reversible hydrostatic motors 14 which are driven by a main fixed displacement pump 16, the discharge of which is controlled by the control system to be described. Main drive wheels 10 are driven by the engine through a drive train which includes a transmission 17 (FIG. 3) and a differential drive 18 driving an axle 20.

The axle supports a conventional telescopic lift truck upright represented by the numeral 22 having a lift cylinder 24 and a load handling fork and carriage assembly 26 supported from the mast for elevation thereon in a well-known manner. The mast 22 is pivoted form the axle for forward and rearward tilting movement by a pair of double-acting tile cylinders 30 connected to the truck body and to the mast. Lift and tilt cylinder control valves are illustrated at numerals 32 and 34, respectively, the valves being operator controlled by manual levers 36 and 38, valve 32 being an open center single-acting valve for conducting pressure fluid from pump 16 to lift cylinder 24 by way of valve section 40, returning such fluid to a sump 42 under load by way of a valve section 42, and holding the fork 26 and mast at any selected elevation by manipulation to the open-center valve section 44 as shown. Valve 34 operates similarly but is double-acting to pressurize cylinders 30 at either end to tilt the mast 22 forwardly or rearwardly by way of valve sections 46 and 48, respectively, and to hold any selected position by manipulation to the open-center valve portion 50, all in known manner. Pump 16 is connected through the open-center sections of valves 32 and 34 by way of conduits 52 and 54 to the reservoir 42 by way of conduits 56 and 58 and to and from the respective lift and tilt cylinders 24 and 30, depending upon the actuation of the valves to direct the pressure fluid, by way of conduits 60, 62, 64, 66 and 68, return from conduits 62 and 66 to the reservoir being by way of conduit 70, and return from the lift cylinder to the reservoir being by way of conduits 60 and 72 when valve 32 is actuated to make operative section 42 thereof. A pressure responsive relief valve 74 is responsive to the pressure in conduit 54 to limit the pressure drop across control valves 32 and 34, and a pump pressure relief valve 76 is connected between conduits 52 and 58. The hydraulic circuit and controls described thus far in respect of the lift and tilt circuits is conventional. Other components utilized in the hydraulic circuit, such as a counterbalance valve, a load lowering control valve, and the like, have been omitted from the circuit drawing in the interest of simplicity.

Inserted in the above-described circuit between conduits 53 and 54 is an adjustable flow divider unit 90 having divider sections 92 and 94 therein adapted to be supplied with pressure fluid from pump 16, divider section 92 supplying pressure fluid to the above-described tilt and lift circuits, and divider section 94 being adapted to supply pressure fluid to the auxiliary drive circuit, described below, associated with hydrostatic motors 14. Other auxiliary power components comprise a forward and reverse directional control valve 96, a cooling loop valve 98, a pair of check valves 100 and control means connected to the flow divider.

The flow divider is capable of directing the total output of pump 16 either to the lift-tilt circuit or to the reservoir, and substantially the total output thereof to the auxiliary drive circuit. The flow divider and circuit as shown is positioned to direct the total flow to the reservoir by way of divider section 92 and conduits 54, 56 and 58, divider section 94 being substantially closed, and the auxiliary power circuit being entirely closed at closed center control valve 96. Such flow divider units capable of varying the flow through one or the other sections from 0% to 100% are available commercially, one exemplary such unit being manufactured by Fluid Controls, Inc. of Mentor, Ohio, Model 2V21.

The auxiliary power circuit is activated when an actuator cylinder-piston unit 102 of the auxiliary power control is energized to shift the flow-divider unit through a push-pull cable 104 so that a controlled portion of the output of pump 16 up to 100% thereof in the embodiment utilizing such a 2V21 flow divider, is directed to the power assist circuit and not to the lift-tilt circuit. The auxiliary power circuit as shown is inactive with solenoid actuated control valve 96 closed whereby the fluid in the circuit of drive motors 14 is in the closed parallel loop of conduits 106 and 108 and circulates therein, particularly during steering of the vehicle when differential wheel speeds are encountered at wheels 12. The fluid may circulate through the motors in either direction, depending upon the direction of vehicle movement and/or steering. A by-pass cooling circuit is provided through conduits 111, 112 and 114, the solenoid valve 98, and a pressure compensated flow control valve 115 in series with valve 98. Valve 115 permits only a predetermined fluid flow therethrough irrespective of variations in inlet pressure to the valve. An exemplary valve of the type contemplated is manufactured by Fluid Controls, Inc., supra, Model 2F74. The cooling circuit through conduits 112 and 114 normally functions when control valve 96 is closed and the auxiliary power is not in use by exhausting a relatively small volume of flow, as controlled by valve 115, from the closed loop of motors 14 to the reservoir. Make-up fluid in the motor 14 loop is provided through one of the check valves 100, depending upon the direction of vehicle operation, as a result of a predetermined base pressure maintained in conduits 56, 117 and 119 by a check valve 121 in conduit 58.

If valve 96 is actuated upwardly the output of pump 16 flows through section 94 of the flow divider, a conduit 118, a valve section 116 of valve 96, and conduits 111 and 106 through motors 14 to rotate wheels 12 in a forward direction, returning to the reservoir by way of conduits 108, 110 and 114. A reversal of valve 96 to communicate a section 120 thereof with said conduits reverses the flow through motors 14 to power assist the vehicle in reverse drive.

Flow divider 90 is controlled by a hydraulic servo system so that only that portion of the output of pump 16 flows through the power assist circuit as may be required to effect a rotational speed of wheels 12 which is the same as the speed of wheels 10, assuming that the wheels are of the same diameter. If the wheels differ in diameter, a speed of wheels 12 is controlled to traverse the same circumferential distance as wheels 10 in the same period of time. In other words, regardless of the diameter of one wheel or pair of wheels in relation to the diameter of another pair of wheels, the auxiliary powered wheels are operated at such wheel speeds as to minimize any scrubbing effect as between pairs of wheels 10 and 12, which wuld result if the wheels were rotated at different effective speeds. The term same or matching "effective speed", or its equivalent, as used herein, shall mean that auxiliary wheel means is driven to traverse substantially the same circumferential distance as main wheel means in the same period of time irrespective of variations in surface or road traction as between said main and auxiliary wheel means.

That portion of the output of pump 16 not required to operate wheels 12 at the controlled speed is directed through section 92 of the flow divider into the lift-tilt circuit or to the reservoir through the open-center valve sections 44 and 50, depending upon selection by the operator. Hydraulic servo control components which operate to position the control of the proportional flow divider as required for a given selected vehicle speed under power assist conditions comprise a fixed displacement pump 122, a pump pressure relief valve 124, a solenoid actuated two-position valve 126, an orifice 128 and a check valve 130. Pump 122 is connected to reservoir 42 and directs fluid discharge to solenoid valve 126 by way of conduit 132, valve 126 in the position illustrated functioning to recirculate the pump discharge back to reservoir through conduits 134 and 136, pump 122 being preferably operable only when the transmission is operating in first or low gear in the mechanical front wheel drive version of FIG. 1. In such embodiment pump 122 may be engine driven, which, in the use of the hydraulic servo system illustrated, effects a pump pressure output in actuator 102 which is proportional to vehicle speed. When actuated, valve 126 directs pump output through a conduit 138 to the reservoir by way of conduits 140 and 136, restriction 128, and check valve 130, the intermediate pressure in conduit 140 being directed through the branch conduit thereof to actuator cylinder 102 which controls the division of flow at divider 90 to the power assist and the lift-tilt circuits. Persons skilled in the art will appreciate that the matching of components 102, 122, 128 and 130 in the hydraulic servo control circuit must be such as to produce a pump flow and pressure which controls the position of the piston in actuator 102 so that the flow divider setting accurately controls the flow to motors 14 in proportion to the speed of wheels 10, thereby matching effective speeds of wheels 10 and 12. Inasmuch as the auxiliary drive system is designed for intermittent use only as required, relatively inexpensive components may be utilized, and in the embodiment of FIG. 1 equal effective wheel speeds is controlled by the above described low gear transmission drive of pump 122 in said servo system. The orifice 128 is sized such that excess flow in the servo circuit returns to the reservoir through check valve 130 upon the generation of a wheel speed proportional pressure in cylinder 102.

Figure 2:
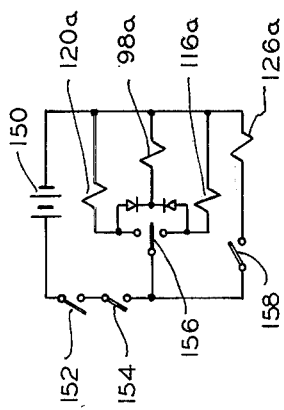
FIG. 2 is a control for a portion of the system shown in FIG. 1.

FIG. 2 illustrates control means for operating the solenoid valves in the power assist circuit which includes a battery 150, an operator's master switch 152, a second control switch 154 which may, for example, be operated in a mechanical drive system of wheels 10 by engaging a gear shift selector lever in first and/or drive gear, and a manual forward and reverse switch 156 for operating valve 96 by energizing solenoid 116a or 120a to operate valve section 116 or 120. The closing of switch 156 in either direction energizes the solenoid coil 98a to close valve 98, and a switch 158 operates solenoid valve 126 by coil 126a. Switch 158 is a normally closed switch so that under most conditions of operation closing of switches 152 and 154 will activate valves 96, 98 and 126, and thereby the auxiliary drive system through flow divider section 94 to drive wheels 12. Both the lift and tilt functions of the mast are operative, but at slower speeds when the auxiliary drive system is in operation, the speed of lift of fork 26, for example, being inversely proportional to the volume of fluid directed to flow divider section 94.

Switch 158 may, for example, be operatively connected to the lift lever 36 so that upon operator's demand for full lift speed switch 158 is opened which automatically terminates fluid flow to the auxiliary drive motors by actuating valve 126 to its illustrated position causing cylinder 102 to actuate flow divider 90 to the position shown at which full lift speed is available. Switch 158 may in addition to or alternatively also be actuated in the mechanical front drive system shown by the clutch, as when a lift truck operator demands a high lift speed the clutch is depressed and the engine speed is increased to drive pump 16 at a high rpm. Depression of the clutch would therefore open switch 158 while switches 152 and 154 remain close for auxiliary drive upon release of the clutch to again close switch 158.

In operation, the components of the system are normally positioned as shown in FIG. 1 in respect of the lift, tilt and auxiliary drive circuits. Under normal operating conditions lift and/or tilt of the mast 22 and fork 26 is controlled by the operator as required for load handling operations by manipulation of control valves 32 and/or 34, flow being provided by pump 16 through flow divider section 92 while motors 14 free-wheel in the closed loop above described. All other components of the auxiliary drive and control circuits are positioned aas illustrated in FIGS. 1 and 2.

Under any adverse operating conditions which requires auxiliary power the switches 152 and 154 are closed as explained above to condition the auxiliary drive system for operation, since it will be recalled that switch 158 is normally closed under such conditions. In this condition valve 126 is actuated to communicate conduit 132 with cylinder 102 through conduits 138 and 140 to actuate flow divider 90 to establish a division of flow as determined by the actuating pressure in cylinder 102. That pressure is intermediate the discharge pressure of fixed displacement servo pump 122 and reservoir pressure as established by restriction 128 and check valve 130. Actuation of switch 156 by the operator in one direction or the other activates directional control valve 96 for forward or reverse drive producing traction flow through motors 14 which is recirculated through the opposite section of valve 96 to the reservoir and pumps 16 and 122.

Figure 3:
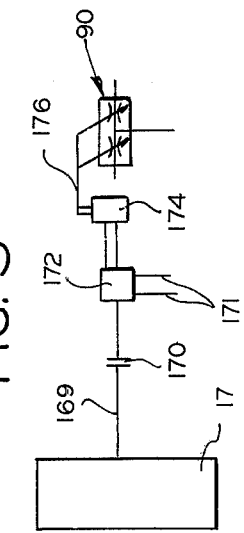
FIG. 3 is a modification of a portion of the control shown in FIG. 1.

An alternate system of control is disclosed in FIG. 3 wherein the speedometer output shaft 169 of the transmission 17 drives through a magnetic coupling 170, a potentiometer 172 connected thereto which is connected to a battery by lines 171, and a servo motor 174 driven from the potentiometer and which is adapted to be connected directly to flow divider 90 by linkage means 176 thereby performing the same function by electrical means as is performed by the hydraulic servo control shown in FIGS. 1 and 2.

It should be pointed out that a somewhat modified electrical servo as shown in FIG. 3 may be applied to drive pump 122 directly from a vehicle speed responsive device represented diagrammatically at numeral 177 in FIG. 1. Such a device may be mounted on the rim of one of wheels 10 and connected to a magnetic coupling, potentiometer and servo motor as in FIG. 3, except that the servo motor should be of the rotary output type for coupling to drive pump 122. Such wheel rim speed responsive devices are manufactured by Endler Instrument Company of Jersey City, N.J.

Figure 4:
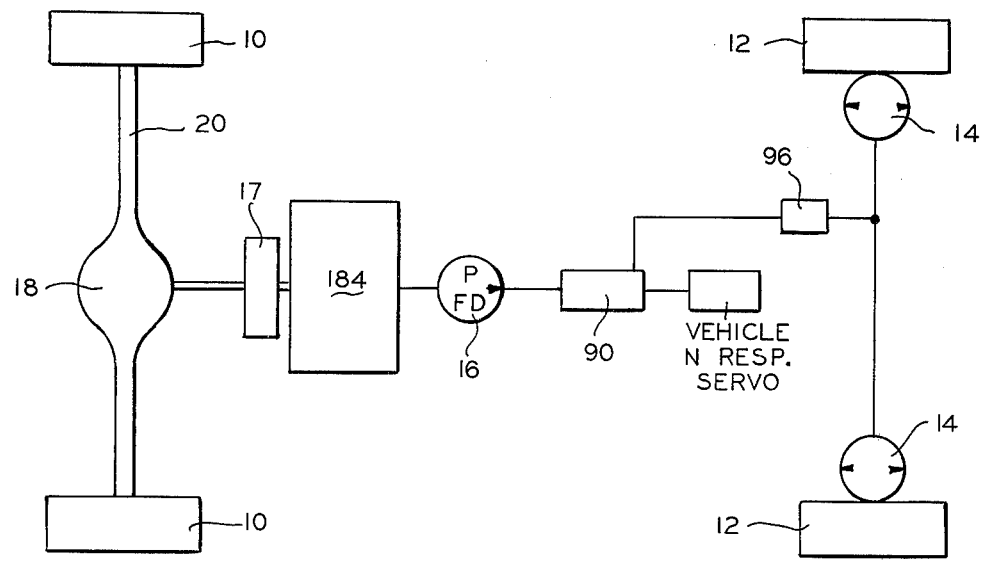
FIG. 4 is a diagrammatic view of a modified system.

FIG. 4 discloses in diagrammatic form the system of FIG. 1, except that it is not combined in a lift truck type vehicle. It utilizes a fluid volume division control, such as flow divider 90, the one section 92 of which is adapted to vent excess fluid not utilized during auxiliary drive to a reservoir directly. The pump may be an engine driven fixed displacement pump, the same as pump 16 in FIG. 1, and the vehicle speed responsive servo control may be as disclosed in FIG. 1 or in FIG. 3, or of any other suitable type. An engine is represented at 184.

It will be appreciated that a pair of engine driven variable displacement pumps mounted on a common shaft may be substituted for flow divider 90, particularly in an embodiment which utilizes separate work means such as in the lift-tilt circuit of FIG. 1, use of either the hydraulic servo control of FIG. 1 or the electric servo control of FIG. 3 being operable to adjust the displacement of such pumps as required to perform the function above-described in relation to the operation of flow divider 90. Various other types of vehicles may utilize our invention to advantage such as agricultural vehicles which frequently encounter a variety of field conditions in which auxiliary drive would be beneficial, as in muddy and terraced fields, irrigated land with ditches, and under other adverse field conditions. Likewise, road building scraper machines, towing tractors, three-wheeled vehicles, chemical sprayers, and car spotters may intermittently use such auxiliary power regardless of the nature of the main propulsion system to wheels 10, whether mechanical, hydraulic or electric. In earth moving scraper machines, for example, the benefit is apparent in the use of auxiliary drive hydrostatic motors at the large idler wheels which support the bucket, at which location no transverse drive axle of any kind is possible.

Although a number of embodiments of our invention have been described herein, this disclosure is merely for the purpose of illustration and not as a limitation on the scope of the invention. It is therefore to be understood that the invention is not limited to any one or more of the specific embodiments shown, but may be used in various other ways, and various modifications may be made to suit different requirements, and that other changes, substitutions, additions and omissions may be made in the construction, arrangement and manner of operation of the system without necessarily departing from the scope of the invention as defined in the following claims.

We claim:

1. Propulsion means for a vehicle having front and rear drive wheel means comprising a main drive train for operating one of said wheel means, and an auxiliary drive train for operating the other of said wheel means, said auxiliary drive train including hydraulic motor means for operating said other wheel means, auxiliary drive pump means adapted to drive said hydraulic motor means, vehicle speed responsive means independent of said pump means and operatively connected to said auxiliary drive train to control the speed of said motor means such that said other wheel means is driven at an effective speed which is substantially equal to the driven effective speed of said one wheel means, and an operator control for selectively disengaging said auxiliary drive train, said independent vehicle speed responsive means including an adjustable fluid flow divider means operatively intermediate said pump and motor means for controlling the volume of fluid flowing to said hydraulic motor means to effect said driven effective speed of said other wheel means.

2. Vehicle propulsion means as claimed in claim 1 wherein said pump means is a fixed displacement pump, and said flow divider means is adjusted to separate that volume of fluid in excess of that required to maintain said effective speed and direct said excess volume of fluid out of the hydraulic motor circuit.

3. Vehicle propulsion means claimed in claim 1 wherein said vehicle speed responsive means includes also a hydraulic servo system controlling said flow divider means comprising a vehicle speed responsive hydraulic pump and actuator operatively connected to said flow divider means for adjusting the latter means.

4. In a vehicle having front and rear drive wheel means and work means supported from the vehicle, a main drive train including a prime mover for operating one of said wheel means, an auxiliary drive train operating the other of said wheel means and adapted to be coordinated with the operation of said work means, said auxiliary drive train including hydraulic motor means for operating said other wheel means, auxiliary drive pump means adapted to drive said motor means, vehicle speed responsive means operatively connected to said auxiliary drive train to control the speed of said motor means such that said other wheel means is driven at an effective speed which is substantially equal to the driven effective speed of said one wheel means, and an operator control for selectively operating said hydraulic motor means, said vehicle speed responsive means including means operative in said auxiliary drive train and receiving the discharge of said pump means for controlling the volume of fluid flowing to said hydraulic motor means to effect said driven effective speed of said other wheel means, the volume of pump discharge in excess of that required to thus drive said other wheels means being available to operate said work means.

5. A vehicle as claimed in claim 4 wherein said vehicle is a lift truck and said work means is elevatable load handling means mounted from the one end of said truck, and a second operator control for directing said excess fluid volume either to the work means to elevate the load handling means or to the inlet side of said pump means.

6. A vehicle as claimed in claim 5 wherein said vehicle speed responsive means includes an adjustable fluid flow divider means which is selectively operable to direct fluid flow to said motor means in a volume to maintain said effective speed or to direct the entire fluid discharge of said pump means to elevate said load engaging means at the operator's selection under which latter condition the said other wheel means is idler wheel means and the said one wheel means is operable in traction drive by said main drive train.

7. A vehicle as claimed in claim 6 wherein said vehicle speed responsive means includes hydraulic servo control means including vehicle speed responsive pump means for adjusting said flow divider means.

8. A vehicle as claimed in claim 6 wherein said vehicle speed responsive means includes electrical servo control means responsive to vehicle speed for adjusting said flow divider means.

9. A vehicle as claimed in claim 4 wherein said one wheel means is a pair of front wheels and said main drive train includes a transmission and transverse drive axle driving said front wheels.

* * * * *